US012652562B2

(12) United States Patent
Jiang

(10) Patent No.: US 12,652,562 B2
(45) Date of Patent: Jun. 9, 2026

(54) CONNECTION FAILURE DETECTION METHOD AND APPARATUS, COMMUNICATION DEVICE, AND STORAGE MEDIUM

(71) Applicant: Beijing Xiaomi Mobile Software Co., Ltd., Beijing (CN)

(72) Inventor: Xiaowei Jiang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 341 days.

(21) Appl. No.: 18/558,046

(22) PCT Filed: May 8, 2021

(86) PCT No.: PCT/CN2021/092468
§ 371 (c)(1),
(2) Date: Oct. 30, 2023

(87) PCT Pub. No.: WO2022/236498
PCT Pub. Date: Nov. 17, 2022

(65) Prior Publication Data
US 2024/0224093 A1     Jul. 4, 2024

(51) Int. Cl.
*H04W 24/08*          (2009.01)

(52) U.S. Cl.
CPC .................................. *H04W 24/08* (2013.01)

(58) Field of Classification Search
CPC ........... H04W 74/002; H04W 74/0833; H04W 24/04; H04W 76/11; H04W 76/28; H04W 24/08
See application file for complete search history.

(56) References Cited

U.S. PATENT DOCUMENTS

| | | | | |
|---|---|---|---|---|
| 2022/0095410 A1* | 3/2022 | Shih | ...................... | H04B 7/0695 |
| 2022/0330055 A1* | 10/2022 | Babaei | .................. | H04L 1/1887 |
| 2023/0225004 A1* | 7/2023 | Wang | .................... | H04W 76/30 |
| | | | | 370/328 |
| 2023/0284231 A1* | 9/2023 | Lin | ........................ | H04W 72/21 |
| | | | | 370/252 |
| 2023/0413345 A1* | 12/2023 | Yue | .................. | H04W 74/0875 |
| 2024/0057173 A1* | 2/2024 | Liu | ..................... | H04W 74/002 |

FOREIGN PATENT DOCUMENTS

| | | |
|---|---|---|
| CN | 104105114 A | 10/2014 |
| CN | 109428687 A | 3/2019 |
| CN | 110351756 A | 10/2019 |
| CN | 111095973 A | 5/2020 |

(Continued)

OTHER PUBLICATIONS

The First Office Action issued by the State Intellectual Property Office of People's Republic of China on Jun. 22, 2025, in corresponding Application No. CN 202180001467.6, 20 pages.

(Continued)

*Primary Examiner* — Rushil P. Sampat
(74) *Attorney, Agent, or Firm* — Finnegan, Henderson, Farabow, Garrett & Dunner, L.L.P.

(57)          ABSTRACT

A method for a connection failure detection is performed by a user equipment (UE). The method includes: performing the connection failure detection for a small data transmission (SDT) process.

12 Claims, 4 Drawing Sheets

Base station

UE

S310: sending connection-associated specific indication information; wherein the specific indication information is configured to trigger the UE to stop the connection failure detection for the SDT process

(56) References Cited

FOREIGN PATENT DOCUMENTS

WO      WO 2022147817 A1  *   7/2022

OTHER PUBLICATIONS

"T319-like timer for the SDT procedure", Panasonic, 3GPP TSG-RAN WG2 Meeting #113-e, R2-2100817, Online, Jan. 25-Feb. 5, 2021, 4 pages.
Extended European Search Report Issued in Application No. 21941079.2 dated Jun. 7, 2024, 7 pages.
International Search Report of PCT Application No. PCT/CN2021/092468, mailed Dec. 2, 2021, issued by the China National Intellectual Property Administration.
"Report of [Post113-e][503][SDT] T319, cell reselection and re-establishment", InterDigital (email discussion rapporteur), 3GPP RAN WG2 Meeting #113bis-e, R2-2103971, eMeeting, Apr. 12-20, 2021, 33 pages.
"Small data transmission failure and cell reselection", InterDigital, 3GPP RAN WG2 Meeting #112e, R2-2010109, eMeeting, Nov. 2-13, 2020, 4 pages.
"Small data transmission failure timer", InterDigital, Asis Pacific Telecom, Ericsson, ETRI, FGI,Sharp, Sony, 3GPP RAN WG2 Meeting #113e, R2-2101578, eMeeting, Jan. 25-Feb. 5, 2021, 3 pages.

* cited by examiner

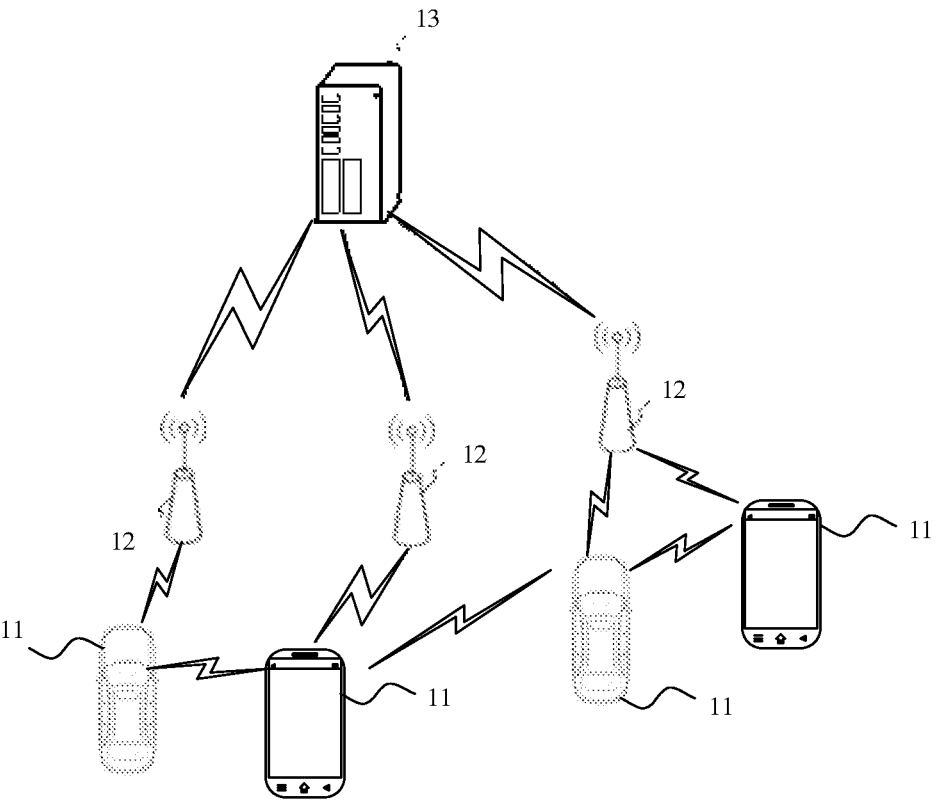
FIG. 1
| S110: performing the connection failure detection for a small data transmission SDT process |
|---|
FIG. 2
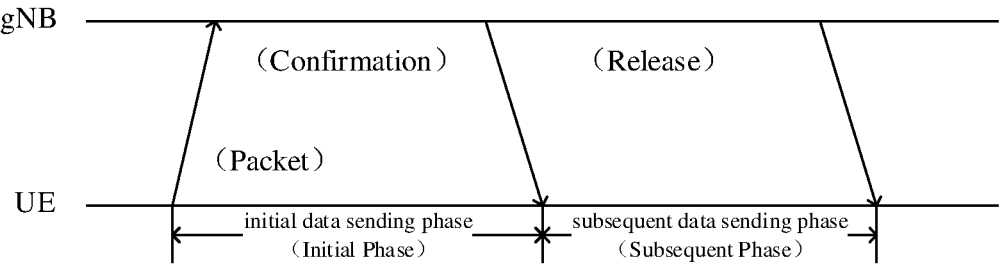
FIG. 3

S111: performing the connection failure detection for the SDT process according to a failure detection configuration obtained

FIG. 4

S112: stopping the connection failure detection for the SDT process, in response to a stop event being detected

FIG. 5

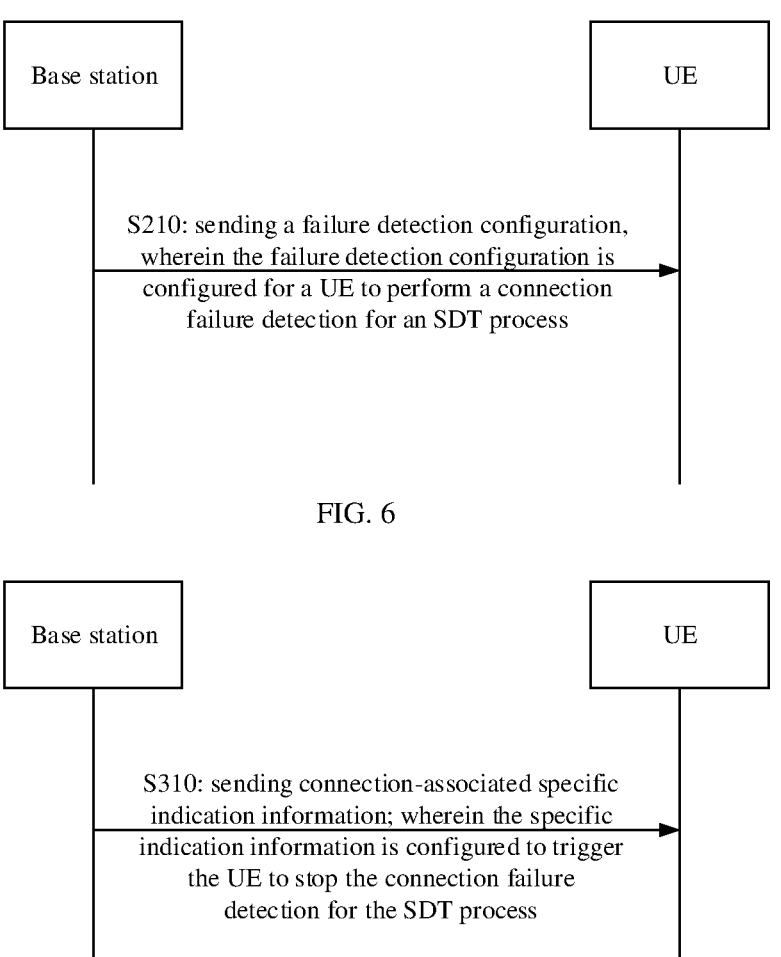

Base station

UE

S210: sending a failure detection configuration, wherein the failure detection configuration is configured for a UE to perform a connection failure detection for an SDT process

FIG. 6

Base station

UE

S310: sending connection-associated specific indication information; wherein the specific indication information is configured to trigger the UE to stop the connection failure detection for the SDT process

FIG. 7

CONNECTION FAILURE DETECTION METHOD AND APPARATUS, COMMUNICATION DEVICE, AND STORAGE MEDIUM

CROSS-REFERENCE TO RELATED APPLICATIONS

This application is a U.S. National Phase application of International Application No. PCT/CN2021/092468, filed May 8, 2021, the entire contents of which are incorporated herein by reference.

TECHNICAL FIELD

The present disclosure relates to, but is not limited to, the technical field of wireless communication, and more particularly to a method and apparatus for a connection failure detection, a communication device and a storage medium.

BACKGROUND

Connection failure detection is a way to detect the quality of a radio link between a UE and a base station. In a connected state, the UE will perform the connection failure detection according to a failure detection configuration. If a connection failure is detected, the UE will re-establish a connection with the base station by way of connection recovery, connection re-establishment or connection establishment.

Small data transmission (SDT) is such a process that is executed by a UE (that is, the UE transmits data in the SDT process) via a random access and/or a dedicated physical uplink shared channel (PUSCH) (i.e., configure grant physical uplink shared channel (CG PUSCH)) resource or a pre-allocated uplink resource (PUR) when the UE is in an inactive state and/or an idle state. In the SDT process, a terminal will recover a data transmission of a signal radio bearer (SRB) 1, and at the same time, the terminal will also recover a data transmission of a signal radio bearer (SRB) 2 and/or a specified data radio bearer (DRB) according to a network configuration indication. In some cases, the small packet transmission in the SDT process may have a high failure rate. However, there is currently no connection failure detection technology for the SDT process.

SUMMARY

Embodiments of the present disclosure provide a method and apparatus for a connection failure detection, a communication device and a storage medium.

A first aspect of embodiments of the present disclosure provides a method for a connection failure detection. The method is performed by a user equipment UE and includes: performing the connection failure detection for a small data transmission SDT process.

A second aspect of embodiments of the present disclosure provides an information processing method. The method is performed by a base station and includes: sending a failure detection configuration. The failure detection configuration is configured for a UE to perform a connection failure detection for an SDT process.

A third aspect of embodiments of the present disclosure provides an apparatus for a connection failure detection. The apparatus is performed by a user equipment UE and includes a detection module. The detection module is configured to perform the connection failure detection for a small data transmission SDT process.

A fourth aspect of embodiments of the present disclosure provides an information processing apparatus. The apparatus includes a sending module. The sending module is configured to send a failure detection configuration. The failure detection configuration is configured for a UE to perform a connection failure detection for an SDT process.

A fifth aspect of embodiments of the present disclosure provides a communication device, which includes a processor, a transceiver, a memory, and an executable program stored on the memory and runnable by the processor. The processor executes the method for the connection failure detection as provided in the first or second aspect when running the executable program.

A sixth aspect of embodiments of the present disclosure provides a computer storage medium having stored therein an executable program that, when executed by a processor, causes the method for the connection failure detection as provided in the first or second aspect to be implemented.

According to the technical solutions provided by embodiments of the present disclosure, even if the UE is in an idle state or an inactive state, if the SDT process needs to be performed, the connection failure detection will be performed for the connection in the SDT process. In this way, on the one hand, the cause of the failure of the small packet transmission in the SDT process may be learned, on the other hand, when the connection failure is detected, the small packet transmission in the SDT process can be adjusted in time to improve the success rate and quality of the small packet transmission.

It is to be understood that both the foregoing general description and the following detailed description are illustrative and explanatory only and are not restrictive of embodiments of the present disclosure.

BRIEF DESCRIPTION OF THE DRAWINGS

The accompanying drawings, which are incorporated in and constitute a part of this specification, illustrate embodiments consistent with the present disclosure, together with the description, serve to explain the principles of embodiments of the present disclosure.

FIG. 1 is a schematic structural diagram showing a wireless communication system according to an illustrative embodiment:

FIG. 2 is a schematic flowchart showing a method for a connection failure detection according to an illustrative embodiment:

FIG. 3 is a schematic timing diagram of an SDT process according to an illustrative embodiment:

FIG. 4 is a schematic flowchart showing a method for a connection failure detection according to an illustrative embodiment:

FIG. 5 is a schematic flowchart showing a method for a connection failure detection according to an illustrative embodiment:

FIG. 6 is a schematic flowchart showing a method for a connection failure detection according to an illustrative embodiment:

FIG. 7 is a schematic flowchart showing a method for a connection failure detection according to an illustrative embodiment:

DETAILED DESCRIPTION

Figure 8:
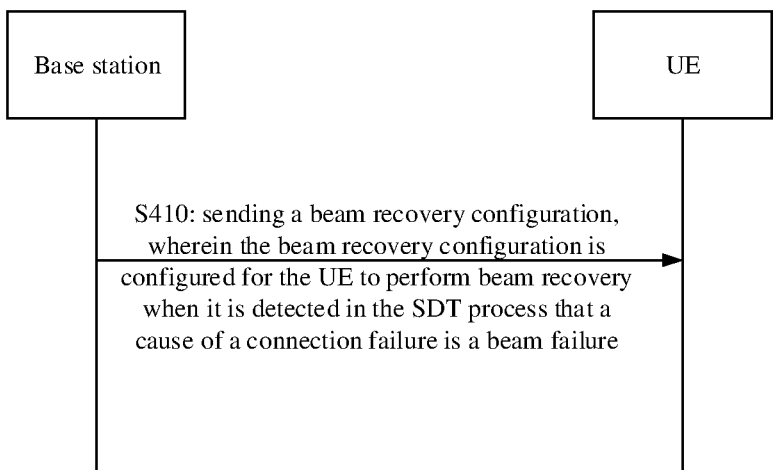
FIG. 8 is a schematic flowchart showing a method for a connection failure detection according to an illustrative embodiment.

Reference will now be made in detail to illustrative embodiments, examples of which are illustrated in the accompanying drawings. The following description refers to the accompanying drawings in which the same numbers in different drawings represent the same or similar elements unless otherwise represented. The implementations set forth in the following description of illustrative embodiments do not represent all implementations consistent with embodiments of the present disclosure. Instead, they are merely examples of apparatuses and methods consistent with some aspects of embodiments of the present disclosure as recited in the appended claims.

Terms used in embodiments of the present disclosure are only for the purpose of describing specific embodiments, but should not be construed to limit embodiments of the present disclosure. As used in the embodiments of the present disclosure and the appended claims, "a/an", "said" and "the" in singular forms are intended to include plural forms, unless clearly indicated in the context otherwise. It should also be understood that, the term "and/or" used herein represents and contains any or all possible combinations of one or more associated listed items.

It should be understood that, although terms such as "first," "second" and "third" may be used in embodiments of the present disclosure for describing various information, these information should not be limited by these terms. These terms are only used for distinguishing information of the same type from each other. For example, first information may also be referred to as second information, and similarly, the second information may also be referred to as the first information, without departing from the scope of embodiments of the present disclosure. As used herein, the term "if" may be construed to mean "when" or "upon" or "in response to determining" depending on the context.

Referring to FIG. 1, which is a schematic diagram showing a wireless communication system provided by embodiments of the present disclosure. As shown in FIG. 1, the wireless communication system is a communication system based on a cellular mobile communication technology, and may include several UEs 11 and several base stations 12.

The UE 11 may refer to a device that provides voice and/or data connectivity to a user. The UE 11 can communicate with one or more core networks via a radio access network (RAN). The UE 11 may be an Internet of Things UE, such as a sensor device, a mobile phone (or referred to as a "cellular" phone) and a computer with an Internet of Things UE. For example, the UE 11 may be a fixed, portable, pocket-sized, handheld, built-in computer or vehicle-mounted apparatus, such as a station (STA), a subscriber unit, a subscriber station, a mobile station, a mobile, a remote station, an access point, a remote UE (remote terminal), an access UE (access terminal), a user apparatus (user terminal), a user agent, a user device, or a user UE (user equipment, UE). Alternatively, the UE 11 may be a device of an unmanned aerial vehicle. Alternatively, the UE 11 may be a vehicle-mounted device, for example, a vehicle-mounted computer with a wireless communication function, or a wireless communication device externally connected with a driving computer. Alternatively, the UE 11 may be a roadside device, such as a street lamp, a signal lamp or other roadside devices with a wireless communication function.

The base station 12 may be a network side device in the wireless communication system. The wireless communication system may be a 4th generation mobile communication (4G) system, also referred to as a long term evolution (LTE) system. Alternatively, the wireless communication system may be a 5G system, also referred to as a new radio (NR) system or a 5G NR system. Alternatively, the wireless communication system may be a next generation system of the 5G system. The access network in the 5G system may be referred to as a new generation-radio access network (NG-RAN), or a MTC system.

The base station 12 may be an evolved base station (eNB) used in the 4G system. Alternatively, the base station 12 may be a base using a centralized distributed architecture (gNB) in the 5G system. When the base station 12 adopts the centralized distributed architecture, it usually includes a central unit (CU) and at least two distributed units (DUs). A protocol stack of a packet data convergence protocol (PDCP) layer, a radio link control (RLC) layer and a media access control (MAC) layer is provided in the central unit. A protocol stack of physical (PHY) layers is provided in the distributed unit. The specific implementation of the base station 12 is not limited in embodiments of the present disclosure.

A wireless connection may be established between the base station 12 and the UE 11 through a wireless radio. In different embodiments, the wireless radio is a wireless radio based on the 4th generation mobile communication network technology (4G) standard. Alternatively, the wireless radio is a wireless radio based on the 5th generation mobile communication network technology (5G) standard. For example, the wireless radio is a new radio. Alternatively, the wireless radio may also be a wireless radio based on the next generation mobile communication network technology standard of the 5G.

In some embodiments, an end to end (E2E) connection may also be established between UEs 11, for example, a vehicle to vehicle (V2V) communication, a vehicle to infrastructure (V2I) communication and a vehicle to pedestrian (V2P) communication in a vehicle to everything (V2X) communication.

In some embodiments, the wireless communication system may further include a network management device 13.

Several base stations 12 are connected to the network management device 13, respectively. The network management device 13 may be a core network device in the wireless communication system, for example, the network management device 13 may be a mobility management entity (MME) in an evolved packet core (EPC). Alternatively, the network management device may be other core network devices, such as a serving gateway (SGW), a public data network gateway (PGW), a policy and charging rules function (PCRF) or a home subscriber server (HSS). The implementation form of the network management device 13 is not limited in the embodiment of the present disclosure.

As shown in FIG. 2, embodiments of the present disclosure provide a method for a connection failure detection, which is performed by a user equipment UE and includes a following step.

In S110, the connection failure detection is performed for a small data transmission SDT process.

The method for the connection failure detection provided by embodiments of the present disclosure may be performed by the UE. In embodiments of the present disclosure, the connection failure detection in the SDT process is performed for the UE in an idle state or the UE in an inactive state. Here, the connection failure detection in the SDT process may be understood as that the UE in the idle state or the inactive state detects a wireless transmission channel, and determines whether a connection fails in the SDT process according to a quality of the detected channel.

The connection failure detection here is to detect a connection in the SDT process, including: to detect a beam used in the SDT process, and/or to detect a channel used in the SDT process. The channel includes, but is not limited to: a random access channel (RACH) and/or a dedicated PUSCH (or called CG-PUSCH), and so on.

In embodiments of the present disclosure, the UE will also perform the connection failure detection in the SDT process, so that it may be determined whether a cause of the failure of the small packet transmission in the SDT is a connection failure, or whether it is necessary to adjust the transmission in time in the SDT process, for example, to delay the transmission in a time domain.

In embodiments of the present disclosure, the small data transmission of the SDT process may be performed in any of the following steps:

carrying a small packet in an Msg3 in a four-step random access process of an initial access;

carrying the small packet in an MsgA in a two-step random access process of the initial access: or sending the small packet in a dedicated uplink physical uplink shared channel (PUSCH) resource configured by a network.

In embodiments of the present disclosure, the small packet here refers to a packet reported in the SDT process.

As shown in FIG. 3, the SDT process may include: an initial data sending phase and a subsequent data sending phase.

The initial data sending phase is started from sending SDT initial data, until receiving acknowledgment information on the initial data from a network side. The acknowledgment information is different for different SDT processes.

For example, in the SDT process of a four-step random access channel, the acknowledgment information may be that a contention resolution identifier of an Msg4 is successfully received: in the SDT process of a two-step random access channel, the acknowledgment information may be that a contention resolution identifier of an MsgB is successfully received. In the CG SDT process, the acknowledgment information may be an indication from the network side which indicates that data is successfully received. The indication may be an acknowledgment character (ACK) indicated in a physical layer (Downlink Control Information, DCI).

As shown in FIG. 4, embodiments of the present disclosure provide a method for a connection failure detection, which includes a following step.

In S111, the connection failure detection is performed for the SDT process according to a failure detection configuration obtained.

In embodiments of the present disclosure, the UE performs the connection failure detection in the SDT process according to the failure detection configuration.

In some embodiments, the failure detection configuration may also be used for the UE to perform the connection failure detection in a connected state. That is, the UE may share the same failure detection configuration in the unconnected state and the connected state. The unconnected state includes: an inactive state and/or an idle state.

In some other embodiments, the failure detection configuration is different from a failure detection configuration of the UE in the connected state. For example, the two failure detection configurations define different trigger events for triggering the connection failure detection, and/or, the two failure detection configurations define different frequencies for the connection failure detection. For example, detection frequency indicated by the failure detection configuration in the unconnected state is lower than a detection frequency indicated by the failure detection configuration in the connected state.

In still some embodiments, the failure detection configuration includes: the failure detection configuration received from a network side: and/or the failure detection configuration specified in a protocol.

In embodiments of the present disclosure, the failure detection configuration may be configured and sent by the network side, or the failure detection configuration may be pre-configured in the protocol, so that the UE obtains the failure detection configuration by reading the protocol.

The network side here may at least include a radio access network (RAN). For example, the connection failure detection is received from a base station of the RAN.

In short, there are many ways for the UE to obtain the failure detection configuration, which is not limited to any one of the above ways.

In some embodiments, the failure detection configuration received from the network side includes: the failure detection configuration received from the network side and carried in a system message: and/or the failure detection configuration received from the network side and carried in a connection release message.

The failure detection configuration may be carried in the system message. For example, the failure detection configuration may be carried in a master information block (MIB) or a system information block (SIB) x, where x may be any positive integer. For example, x may be 1, 2, 3 or 4, etc.

As shown in FIG. 4, embodiments of the present disclosure provide a method for the connection failure detection, which includes a following step.

In S111, the connection failure detection is performed for the SDT process, in response to detecting a trigger event.

In embodiments of the present disclosure, only when the trigger event is detected, the connection failure detection for the SDT process will be started, and the connection failure detection for the SDT process will not be performed at other moments, so as to reduce unnecessary detections, thereby reducing the power consumption caused by the unnecessary detections.

In some embodiments, the trigger event includes at least one of:

starting the SDT process;

the UE sending uplink data for the first time in the SDT process: or the UE receiving an acknowledgment indication from a network side.

The acknowledgment indication is an indication sent by the network side after receiving the uplink data sent for the first time in the SDT process.

If the UE starts the SDT process in the inactive state or the idle state, that is, it is detected that the SDT process is started, it is considered that the trigger event is detected.

In some embodiments, in order to reduce unnecessary detections, it is not considered that the trigger event is detected when the UE starts the SDT process, but the UE sends the uplink data for the first time in the SDT process or the UE receives the acknowledgment indication on the uplink data sent for the first time. The acknowledgment indication is configured to indicate that the network side receives the uplink data sent for the first time in the SDT process.

In some embodiments, sending the uplink data for the first time in the SDT process includes at least one of:

the UE sending the uplink data for the first time via a random access message 3 of a four-step random access;

the UE sending the uplink data for the first time via a random access message A of a two-step random access; or the UE sending the uplink data for the first time on a configure grant CG physical uplink shared channel PUSCH resource.

In some embodiments, the UE receiving the acknowledgment indication from the network side includes:

receiving a contention resolution identifier of a four-step random access message 4 from the network side;

receiving a contention resolution identifier of a two-step random access message B from the network side: or receiving a successful indication of data transmission on the CG PUSCH resource from the network side.

As shown in FIG. 5, embodiments of the present disclosure provide a method for a connection failure detection, which includes a following step.

In S112, the connection failure detection for the SDT process is stopped, in response to a stop event being detected.

In some embodiments, the connection failure detection of the SDT process may be automatically stopped after a preset period of time or after a preset number of detections.

In embodiments of the present disclosure, the stop event is set, and if the stop event is detected, the connection failure detection for the SDT process is stopped.

In some embodiments, the stop event being detected includes:

a state of the UE being changed: and/or the UE receiving connection-associated specific indication information from the network side.

In embodiments of the present disclosure, the state of the UE being changed may include: a connection state between the UE and the network side being changed.

In embodiments of the present disclosure, the UE receives the connection-associated specific indication information from the network side. Here, the connection-associated specific indication information may include: connection-associated indication information for indicating one or more of connection establishment, connection release, connection recovery, or connection handover.

In some embodiments, the state of the UE being changed includes at least one of:

the state of the UE being changed from an inactive state to an idle state;

the state of the UE being changed from an inactive state to a connected state: or the state of the UE being changed from an idle state to a connected state.

If the state of the UE is changed from the inactive state to the idle state, the UE not only releases the connection with the base station, but also releases the context, and the idle state is a state known by a core network in which the connection has been released, while the inactive state is a state in which the connection between the UE and the base station has been released, but the context has not been released, and the core network does not know that the connected has been released by the UE.

If the state of the UE is changed from the inactive state to the idle state, it means that data or the amount of data to be sent by the UE is reduced, and the probability that the SDT process needs to be performed is reduced, so the connection failure detection of the SDT process can be stopped, thereby reducing unnecessary detections.

In some embodiments, if the UE exits the idle state or the inactive state, the UE is changed to the connected state. In the connected state, the UE can transmit data based on an RRC connection, and in the connected state, the UE may have a dedicated connection failure detection for the connected state. At this time, it is considered that the connection failure detection in the SDT process is detected.

In some embodiments, the UE receiving the connection-associated specific indication information from the network side includes at least one of:

the UE receiving a connection release message from the network side;

the UE receiving a connection recovery message from the network side;

the UE receiving a connection rejection message from the network side: or the UE receiving a connection establishment message from the network side.

The connection release message may be used to trigger the UE to enter the idle state.

The connection recovery message may be used for the UE in the inactive state to enter the connected state.

The connection rejection message may be such a message that is returned by the network side with respect to a connection request and indicates that the network side rejects the connection establishment request.

The connection establishment message may be a message sent by the network side to indicate the UE to enter the connected state by establishing a connection.

In a word, in embodiments of the present disclosure, the specific indication information may be various connection-associated RRC messages, so the stop of the connection failure detection in the SDT process may be informed by transceiving an existing message in the related art, instead of setting a special message to indicate the stop of the connection failure detection in the SDT process, so that the method according to the present disclosure has high compatibility with the related art and can be easily implemented.

In some embodiments, the failure detection configuration includes at least one of:

timer information, indicating a timer associated with the connection failure detection;

counter information, indicating a counter associated with the connection failure detection: or signal indication information, for indicating a signal for performing the connection failure detection.

In embodiments of the present disclosure, the timer information may be information related to timing of the timer. For example, the timer information indicates information such as a duration timed by the timer, a starting moment and/or an ending moment of the timer.

The counter information may be any information indicating counting of the counter. For example, the counter information may include: a maximum counting value.

In some embodiments, the signal indication information may indicate: a signal that needs to be detected when performing the connection failure detection in the SDT process, and the signal may be various physical layer reference signals.

In some embodiments, the timer includes at least one of:

a physical layer out-of-sync timer, configured to time a physical layer out-of-synchronization; or a beam failure timer, configured to time a beam failure detection.

Specifically, the timer includes various different types of timers, or timers for different types of connection failures.

For example, the physical layer out-of-sync timer mainly counts physical layer out-of-sync phenomenon. For example, the synchronization of the physical layer may be a synchronization established for a synchronization signal sent by the network side, and the physical layer out-of-synchronization here means that the physical layer does not establish a relatively accurate synchronization based on the synchronization signal.

In embodiments of the present disclosure, the physical layer out-of-sync timer counts a duration of the physical layer out-of-synchronization. The beam failure timer may time the beam failure detection.

In some embodiments, the counter includes at least one of the following:

an out-of-sync counter, configured to count physical layer out-of-sync indications;

a synchronization counter, configured to count physical layer synchronization indications;

a beam failure counter, configured to count beam failures;

an MAC layer random access counter, configured to count random access times of an MAC layer: or an RLC layer transmission counter, configured to count transmission times of an RLC layer.

If one physical layer failure is detected, one physical layer out-of-sync indication will be generated. In embodiments of the present disclosure, the out-of-sync counter may be used to count physical layer out-of-sync indications.

The synchronization counter may be used to count the physical layer synchronization indications generated by the physical layer synchronization when they are detected.

In other embodiments, when performing the random access, the UE will send a random access request, and when a random access failure occurs, the UE will perform a next random access request. In this way, in embodiments of the present disclosure, the MAC layer random access counter is used to count the random access times of the MAC layer. In another embodiment, the RLC layer is configured with a transmission counter, which may be used to count the transmission times of the random access requests during one random access process of the UE. If the random access has not succeeded when the count reaches a preset value, it may be considered that the random access fails.

In some embodiments, the signal indication information is configured to indicate at least one of:

a signal of a physical layer out-of-sync detection in the connection failure detection; or a signal of a beam failure detection in the connection failure detection.

The signal indicated by the signal indication information includes: a signal for performing the physical layer out-of-sync detection, and/or a signal for performing the beam failure detection.

The signal of the physical layer out-of-sync detection and the signal of the beam failure detection may be the same or different.

For example, the signal of the physical layer out-of-sync detection and the signal of the beam failure detection both may be a synchronization signal block (SSB), a physical broadcast channel block, or a channel state information-reference signal (CSI-RS).

The above only illustrates some examples of the signal of the physical layer out-of-sync detection and/or the signal of the beam failure detection.

In some embodiments, the signal indicated by the signal indication information includes at least one of:

a downlink signal associated with a physical downlink random access channel PRACH resource of a four-step random access;

a downlink signal associated with a physical downlink control channel PDCCH for dispatching a contention resolution identifier of the four-step random access;

a downlink signal associated with a PDCCH channel for dispatching a data transmission, after successfully receiving a contention resolution identifier of a random access message 4 of the four-step random access;

a downlink signal associated with a random access message A of a two-step random access;

a downlink signal associated with a PDCCH for dispatching data, after receiving a contention resolution identifier of a random access message B of a two-step random access;

a downlink signal associated with a CG PUSCH resource;

a downlink signal associated with a PDCCH that sends a transmission success indication: where the transmission success indication indicates a successful data transmission on a CG PUSCH;

a downlink signal associated with a PDCCH for dispatching a data transmission, after receiving the transmission success indication;

a downlink signal sent by a cell where the UE is located;

a downlink signal sent by a BWP where the UE is located;

a downlink signal of a cell detectable by the UE: or a downlink signal detectable by a BWP where the UE is located.

In embodiments of the present disclosure, the downlink signals here each may be a physical layer signal, for example, the downlink signals here each may be a physical layer reference signal.

In embodiments of the present disclosure, a downlink signal associated with xxx may include: a downlink signal having a pre-established correspondence with xxx and/or a downlink signal quasi-co-located with xxx. Here, xxx generally refers to the PDCCH, PUSCH and/or PRACH resources as described in any of the foregoing technical solutions.

The base station allocates random access resources for random access in advance, and a channel corresponding to these random access resources is called a random access channel.

In embodiments of the present disclosure, the downlink signals associated with these random access resources may be signals for performing the physical layer out-of-sync detection and/or the beam failure detection as described above.

For example, the random access channel includes 4 random access resources, which are random access resource 1, random access resource 2, random access resource 3, and random access resource 4. These 4 random access resources may be associated with different SSBs. For example, the random access resource 1 is associated with SSB1, the random access resource 2 is associated with SSB2, the random access resource 3 is associated with SSB3, and the random access resource 4 is associated with SSB4. If the current SDT process is performed on the random access resource 3, the downlink signal indicated by the signal indication information may be: the SSB3 associated with the random access resource 3.

In an embodiment, in a random access process where the four-step random access is successfully received, a transmission resource of the contention resolution identifier of the random access message 4 needs to be dispatched by the PDCCH, and the contention resolution identifier is transmitted on the resource dispatched by the PDCCH. In embodiments of the present disclosure, the signal for performing the physical layer out-of-sync detection and/or the signal for performing the beam failure detection both may be a downlink signal associated with a PDCCH for dispatching the transmission of the contention resolution identifier.

In some embodiments, after the contention resolution identifier of the random access message 4 of the four-step random access is received, dispatching of a physical shared channel (PSCH) will be performed. The PSCH here may include a PDSCH and/or a PUSCH. Generally, a channel for dispatching the PSCH may be a PDCCH. In embodiments of the present disclosure, the signal indicated by the signal indication information may be a downlink signal associated with the PDCCH. Here, the downlink signal associated with the PDCCH for dispatching the data transmission may include: first m downlink signals associated with the PDCCH for dispatching the data transmission. Here, m may be any positive integer.

If a random access performing the current SDT process is a two-step random access, the signal indicated by the signal indication information may be: the downlink signal associated with the random access message A and/or the downlink signal associated with the random access message B. If the SDT process uses the CG PUSCH resource, the signal(s) for performing the physical layer out-of-sync detection and/or the beam failure detection indicated by the signal indication information may be: the downlink signal(s) associated with the CG PUSCH resource.

The SDT process is divided into an initial data sending phase and a subsequent data sending phase. In embodiments of the present disclosure, after uplink data is successfully sent for the first time in the initial data sending phase, the network side will send a transmission success indication, so the UE will receive the transmission success indication. In this case, the signal indicated by the signal indication information may be the downlink signal associated with the PDCCH of the transmission success indication.

Of course, in some other embodiments, the signal for the physical layer out-of-sync detection and/or the signal for the beam failure detection indicated by the signal indication information may be the downlink signal associated with the PDCCH for dispatching the data transmission after receiving the transmission success indication. Here, the downlink signal associated with the PDCCH for dispatching the data transmission may include: first n downlink signals associated with the PDCCH for dispatching the data transmission. Here, n may be any positive integer.

The cell where the UE is located may be a cell where the UE resides. In some embodiments, the signal indicated by the signal indication information may be: all downlink signals sent by the cell where the UE resides.

If a cell is divided into a plurality of BWPs, and active BWP(s) of the UE may be only a part of the plurality of BWPs, or the UE only uses a part of the plurality of BWPs for signal detection and/or data transmission. Here, a part of the plurality of BWPs may include one or more BWPs.

A cell may transmit a downlink signal based on a beam. In this way, when the UE is in a certain position of the cell, it may only be able to detect a downlink signal of the position of the cell where the UE is located, rather than downlink signals of other positions. In embodiments of the present disclosure, the foregoing downlink signal may be any reference signal at a cell level. Correspondingly, the signal indicated by the signal indication information may be: all downlink signals of a cell detectable by the UE.

If the UE has an available BWP, the BWP where the UE is located may be: an active BWP of the UE or all the BWPs that are available to the UE, and the UE is able to detect downlink signal in the BWP(s).

In embodiments of the present disclosure, the signal of the physical layer out-of-sync detection and/or the signal of the beam failure detection are configured in the failure detection configuration in advance through the signal indication information, so that in the SDT process, downlink signal detection may be performed in time directly according to the failure detection configuration, without temporary dispatching performed by the network side.

There are many types of connection failures in the SDT process. For example, the types of connection failures in the SDT process may include one or more of: a connection failure caused by a physical layer out-of-synchronization: a connection failure caused by an MAC layer random access failure: connection failure caused by an RLC layer reaching a maximum number of retransmissions: a beam failure, etc.

In some embodiments, the method further includes:
  reacquiring a connection in response to determining a connection failure based on a result of the failure detection: or
  entering an idle state in response to determining a connection failure based on a result of the failure detection.

Here, the process of reacquiring the connection or entering the idle state may be implemented for any type of connection failure.

For example, the process of reacquiring the connection may include at least one of: a connection establishment process, a connection re-establishment process, and/or a beam recovery process.

In this way, when the UE detects a connection failure, it will reacquire the connection, and transmit the small packet in the SDT process based on the reacquired connection.

By reacquiring the connection, the data may be transmitted in time based on the reacquired connection.

If an urgency degree of data to be transmitted in the SDT process is not high, the amount of data to be transmitted is small, or a service priority is lower than a threshold, and a connection failure is detected currently, indicating that the wireless environment is not good, so the transmission may be suspended. When the transmission is suspended, in order to further save the power consumption of the UE, the UE may enter the idle state with lower power consumption.

In some embodiments, the method further includes: performing beam recovery, in response to determining based on a result of the failure detection that a cause of the connection failure is a beam failure.

Connection reacquisition may be implemented in different ways for different types of connection failures.

In embodiments of the present disclosure, the beam failure may only be caused by the movement of the UE in the cell, and the wireless channel (i.e., the connection) of the cell itself may not be poor in fact. In this case, the connection may be reacquired by the UE merely through the beam recovery.

Therefore, in some embodiments, if the beam failure is detected, the beam recovery is performed. If the connection failure is caused by the beam failure, the beam recovery may be quickly and easily realized through the process of the beam recovery, without through multiple messages from the base station to implement the connection reacquisition.

In some other embodiments, if the beam failure is detected, the beam recovery may not be performed, but the connection may be re-acquired directly through the connection establishment or the connection re-establishment.

The beam recovery corresponds to a beam recovery configuration. For details on how to perform the beam recovery, reference may be made to the beam recovery configuration.

For example, the process of the beam recovery may include: sending a beam recovery request, and returning a feedback on the beam recovery request from the network side.

In some embodiments, the method further includes at least one of:

receiving the beam recovery configuration carried in a system message;

receiving the beam recovery configuration carried in a connection release message; or determining the beam recovery configuration based on a protocol.

In some embodiments, the beam recovery configuration may be carried in a connection reconfiguration message. For example, the beam recovery configuration for the connected state may be carried in the connection reconfiguration message, and the beam recovery configuration for the unconnected state may be carried in the system message or the connection release message. Alternatively, for the beam recovery configuration for the unconnected state, the application probability may be low or the probability of requiring dynamic debugging is low. In this case, the beam recovery configuration may be directly written into a communication standard protocol, so that the UE is able to determine the beam recovery configuration by inquiring the protocol.

In some embodiments, the beam recovery configuration includes at least one of:

beam recovery counter information, indicating a counter for counting a number of times of beam recovery;

beam recovery timer information, indicating a timer for timing a beam recovery duration;

a priority configuration, for indicating a priority of a random access corresponding to the beam recovery, in which random access configurations for beam recovery corresponding to different priorities are different;

a resource configuration, indicating a resource used for the beam recovery: or a threshold configuration, indicating a threshold value used for the beam recovery.

The beam recovery configuration may include one or more timing values of the timer, one or more counting values of the counter, or one or more threshold values for the beam recovery.

For example, the beam recovery counter information indicates the counter for counting the number of times of beam recovery. For example, the counter information may at least include: a maximum counting value of the counter.

In another example, the beam recovery timer information may be used to indicate to time the duration of the beam recovery. For example, the beam recovery timer information may indicate a maximum duration of the timer.

The resource configuration may indicate any resource used for the beam recovery. For example, the resource used for the beam recovery may be a random access resource for the beam recovery. In embodiments of the present disclosure, the random access resource includes: a time-frequency domain resource and/or a sequence resource. Here, the sequence resource may be a random access preamble used in a random access process of the beam recovery or the like.

The threshold configuration may be used to determine whether the beam recovery is currently completed. For example, the beam recovery is performed by a beam measurement carrying an SSB. If it is detected that a measured value of a specific SSB exceeds the threshold value indicated by the threshold configuration, it may be considered that the beam recovery succeeds.

The measured value of the SSB includes, but is not limited to, a reference signal received power (RSPR) and/or a reference signal received quality (RSPQ).

In some embodiments, the beam recovery configuration further includes the priority configuration, and the priority configuration may reuse the priority configuration of the random access. The random access configurations corresponding to different priorities are different. The random access configuration here may include at least one of: a power climb configuration: or a backoff time scaling factor for retransmission of the random access request.

For example, when performing retransmission of the random access request, a transmission power of the random access request increases according to the power climb configuration.

When the random access request fails to be sent, the network side indicates the UE a backoff indicator (BI), and a specific backoff time depends not only on the BI, but also on the backoff time scaling factor. Here, a product of the backoff time scaling factor and the BI may be a specific value of the back-off time.

Understandably, the resource configuration indicates that a contention-based random access request resource of a cell or a BWP where the SDT process occurs is used for the beam recovery.

Understandably, the threshold configuration indicates that a threshold value for selecting a random access request resource is reused as the threshold value for the beam recovery.

In embodiments of the present disclosure, the resource configuration and the threshold configuration both reuse the resource and the threshold value used in the process of the random access request, which simplifies the network configuration on the one hand, and on the other hand, improves the effective utilization of the resource, and reduce the repeated delivery of the resource configuration and/or the threshold configuration.

In some embodiments, the method further includes: receiving feedback information on the beam recovery from the network side. The feedback information indicates a result of the beam recovery.

For example, if the beam recovery succeeds, an indication indicating the recovery success will be received, and if the beam recovery fails, an indication indicating the recovery failure will be received.

In a word, in embodiments of the present disclosure, the feedback information indicating whether the beam recovery succeeds or not may be received from the network side.

In some embodiments, if the feedback information indicates success, the process of the beam recovery may be stopped: if the feedback information indicates that the beam recovery fails, the beam recovery may be stopped directly, and the connection is reacquired by way of connection establishment and/or connection re-establishment. Alternatively, it is determined whether the number of beam failures reaches a maximum value, if the number of beam failures reaches the maximum value, the beam recovery is stopped, and the connection establishment or the connection re-establishment is performed, otherwise, a next beam recovery is perform.

In some embodiments, receiving the feedback information on the beam recovery from the network side includes:

receiving the feedback information on a resource in a subsequent data sending phase of the SDT process: and/or receiving the feedback information carried in a message sent by the network side in a random access.

The receipt of the feedback information may be integrated with the SDT process. For example, the feedback information is received on the resource in the subsequent data sending phase of the SDT process, or the feedback information carried in any random access message is received.

For example, receiving the feedback information on the resource in the subsequent data sending phase of the SDT process includes: receiving the feedback information on a PDCCH resource for dispatching a data transmission in the subsequent data sending phase of the SDT process.

Understandably, receiving the feedback information carried in the message sent by the network side in the random access includes at least one of:

receiving the feedback information carried in a random access message 2 sent by the network side in a four-step random access;

receiving the feedback information carried in a random access message 4 sent by the network side in a four-step random access: or receiving the feedback information carried in a random access message B sent by the network side in a four-step random access.

In some embodiments, if the beam recovery fails, the connection may also be reacquired through the connection establishment and/or the connection re-establishment. For example, the method further includes: reacquiring a connection in response to a failed beam recovery; or entering an idle state in response to a failed beam recovery.

If the beam recovery fails, an operation of reacquiring the connection is performed, and timely transmission of the data is realized through the reacquired connection.

If an urgency degree of data to be transmitted in the current SDT process is low, for example, an allowable delay is greater than a delay threshold corresponding to a high urgency degree, or a service priority is lower than a service priority threshold, indicating that data to be transmitted in the SDT process is not urgent to be transmitted, the UE may enter the idle state to further save the power consumption of the UE.

There are multiple ways to reacquire the connection. For example, reacquiring the connection includes at least one of:

triggering a connection establishment based on a non-access stratum NAS message;

triggering a connection establishment based on a connection establishment request message;

triggering a connection recovery based on a connection recovery request message: or triggering a connection re-establishment based on a connection re-establishment request message.

For example, the NAS message triggers the connection establishment, or the connection request message triggers the connection establishment. The connection request message is an RRC layer message.

The recovery request message triggers the process of the connection recovery, and the connection re-establishment request message triggers the process of the connection re-establishment.

In some embodiments, the method further includes: reporting a result of the connection failure detection.

The connection failure detection will get a result, which is called the result of the connection failure detection. The result of the connection failure detection may include: a result indicating that the connection failure is detected, or a result indicating that it is detected that the connection has not failed.

In some embodiments, the result of the connection failure detection includes at least one of:

a connection failure type indication, indicating a type of a connection failure;

an SDT process indication, configured to indicate that the connection failure is detected in the SDT process;

an SDT phase indication, configured to indicate an SDT phase when the connection failure occurs, the SDT phase including: an initial data sending phase and/or a subsequent data sending phase in the SDT process;

an SDT process type indication, configured to indicate a type of the SDT process: or a service indication, configured to indicate a service that triggers the SDT process.

For example, types of connection failures include, but are not limited to:

a connection failure caused by a physical layer out-of-synchronization;

a connection failure caused by an MAC layer random access failure;

a connection failure caused by an RLC layer reaching a maximum number of retransmissions: or a connection failure caused by a beam failure.

The SDT phase indication determines the SDT phase when the connection failure occurs. The SDT phase includes: the initial data sending phase and the subsequent data sending phase.

In some embodiments, the service indication includes at least one of:

a radio bearer RB identifier of the service;

a service flow identifier of the service;

a session identifier of the service: or a logical channel identifier of the service.

Different services will be mapped to different RBs, and each RBs has an RB identifier, so the RB identifier may be used to identify a service.

If a service is transmitted in the form of a service flow, a service flow identifier will be assigned, and similarly, the service flow identifier may identify the service.

In the service transmission, a session identifier will be assigned, so the session identifier may also identify the service.

In some embodiments, the service is also mapped to a logical channel. Different logical channels have different logical channel identifiers, so a logical channel identifier may also be used to identify a service.

As shown in FIG. 6, embodiments of the present disclosure provide an information processing method, which is performed by a base station, and includes a following step.

In S210, a failure detection configuration is sent. The failure detection configuration is configured for a UE to perform a connection failure detection for an SDT process The information processing method provided by embodiments of the present disclosure may be performed by the base station. The method may include: sending the failure detection configuration by the base station to the UE. The failure detection configuration may be used for the UE to perform the connection failure detection in the SDT process.

In some embodiments, the S210 may include:

sending a system message carrying the failure detection configuration: and/or sending a connection release message carrying the failure detection configuration.

The failure detection configuration is carried in the system message, so that if the failure detection configuration is applicable to all UEs in the cell, all UEs in the cell can receive the corresponding system message.

By carrying the failure detection configuration in the connection release message, the failure detection configuration is carried in the connection release message that triggers the UE to enter the idle state or inactive state in which the SDT process can be performed, instead of sending the failure detection configuration via a dedicated message, and the failure detection configuration is sent before the UE enters the idle state or inactive state, so that the method according to the present disclosure has a small message signaling overhead and is easy to implement.

As shown in FIG. 7, embodiments of the present disclosure provide an information processing method, which is performed by a base station, and includes a following step.

In S310, connection-associated specific indication information is sent. The specific indication information is configured to trigger the UE to stop the connection failure detection for the SDT process.

By using the connection-associated specific indication information to indicate the UE to stop the connection failure detection, any other connection-related information may be reused, so that the method according to the present disclosure has a strong compatibility with the related art.

In some embodiments, the specific indication information includes at least one of:

a connection release message;

a connection recovery message;

a connection rejection message: or a connection establishment message.

For the relevant descriptions of the above specific indication message, reference may be made to the foregoing embodiments, which will not be repeated here.

In some embodiments, the failure detection configuration includes at least one of:

timer information, indicating a timer associated with the connection failure detection;

counter information, indicating a counter associated with the connection failure detection: or signal indication information, for indicating a signal for performing the connection failure detection.

For the relevant descriptions of the timer information, the counter information and the signal indication information here, reference may be made to the foregoing embodiments, which will not be repeated here.

In some embodiments, the timer includes at least one of:

a physical layer out-of-sync timer, configured to time a physical layer out-of-synchronization; or a beam failure detection timer, configured to time a beam failure detection.

In some embodiments, the counter includes at least one of:

an out-of-sync counter, configured to count physical layer out-of-sync indications;

a synchronization counter, configured to count physical layer synchronization indications;

a beam failure counter, configured to count beam failures;

a media access control MAC layer random access counter, configured to count random access times of an MAC layer: or a radio link control RLC layer transmission counter, configured to count transmission times of an RLC layer.

In some embodiments, the signal indication information is configured to indicate at least one of:

a signal of a physical layer out-of-sync detection in the connection failure detection; or a signal of a beam failure detection in the connection failure detection.

In some embodiments, the signal indicated by the signal indication information includes at least one of:

a downlink signal associated with a physical downlink random access channel PRACH resource of a four-step random access;

a downlink signal associated with a physical downlink control channel PDCCH for dispatching a contention resolution identifier of a four-step random access;

a downlink signal associated with a PDCCH channel for dispatching a data transmission, after successfully receiving a contention resolution identifier of a random access message 4 of a four-step random access;

a downlink signal associated with a random access message A of a two-step random access;

a downlink signal associated with a PDCCH for dispatching data, after receiving a contention resolution identifier of a random access message B of a two-step random access;

a downlink signal associated with a CG PUSCH resource;

a downlink signal associated with a PDCCH that sends a transmission success indication: the transmission success indication being configured to indicate a successful data transmission on a CG PUSCH;

a downlink signal associated with a PDCCH for dispatching a data transmission, after receiving the transmission success indication;

a downlink signal sent by a cell where the UE is located;

a downlink signal sent by a BWP where the UE is located;

a downlink signal of a cell detectable by the UE: or a downlink signal detectable by a BWP where the UE is located.

As shown in FIG. 8, embodiments of the present disclosure provide an information processing method, which is performed by a base station. The method includes a following step.

In S410, a beam recovery configuration is sent. The beam recovery configuration is at least used for the UE to perform beam recovery when it is detected in the SDT process that a cause of a connection failure is a beam failure.

In embodiments of the present disclosure, the beam recovery configuration sent may be the same as or different from the beam recovery configuration in the connected state. If the beam recovery configuration is the same as the beam recovery configuration in the connected state, the UE will directly reuse the beam recovery configuration in the connected state, and the beam recovery configuration sent by the base station here will direct at both the connected state and the unconnected state of the UE. The unconnected state here includes: an idle state and/or an inactive state.

In some embodiments, sending the beam recovery configuration includes at least one of:

sending a system message carrying the beam recovery configuration: or sending a connection release message carrying the beam recovery configuration.

In some embodiments, the beam recovery configuration includes at least one of:

beam recovery counter information, indicating a counter for counting a number of times of beam recovery;

beam recovery timer information, indicating a timer for timing a beam recovery duration;

a priority configuration, for indicating a priority of a random access corresponding to the beam recovery, in which random access configurations for beam recovery corresponding to different priorities are different;

a resource configuration, indicating a resource used for the beam recovery: or a threshold configuration, indicating a threshold value used for the beam recovery.

The random access configuration here may at least include: a power climb configuration, and/or a backoff time scaling factor for retransmission of the random access request.

Here, the resource indicated by the resource configuration may reuse the random access resource, and may include, for example, a PRACH resource and a sequence resource corresponding to a root sequence.

Understandably, the resource configuration indicates that a contention-based random access request resource of a cell or a BWP where the SDT process occurs is used for the beam recovery.

Understandably, the threshold configuration indicates that a threshold value for selecting a random access request resource is reused as the threshold value for the beam recovery.

Understandably, the method further includes: sending feedback information on the beam recovery according to a result of the beam recovery from the UE.

The base station may send the feedback information on the beam recovery to the UE according to the result of the beam recovery from the UE.

Understandably, sending the feedback information on the beam recovery includes:

sending the feedback information on a resource in a subsequent data sending phase of the SDT process; and/or sending a message carrying the feedback information in a random access.

Understandably, sending the feedback information on the resource in the subsequent data sending phase of the SDT process includes:

sending the feedback information on a PDCCH resource for dispatching a data transmission in the subsequent data sending phase of the SDT process.

Understandably, sending the message carrying the feedback information in the random access includes at least one of:

sending a random access message 2 carrying the feedback information in a four-step random access at a network side;

sending a random access message 4 carrying the feedback information in a four-step random access; or sending a random access message B carrying the feedback information in a four-step random access.

Understandably, the method further includes: receiving a result of the connection failure detection.

Understandably, the result of the connection failure detection includes at least one of:

a connection failure type indication, indicating a type of a connection failure;

an SDT process indication, configured to indicate that the connection failure is detected in the SDT process;

an SDT phase indication, configured to indicate an SDT phase when the connection failure occurs, the SDT phase including: an initial data sending phase and/or a subsequent data sending phase in the SDT process;

an SDT process type indication, configured to indicate a type of the SDT process: or a service indication, configured to indicate a service that triggers the SDT process.

Understandably, the service indication includes at least one of:

a radio bearer RB identifier of the service;

a service flow identifier of the service;

a session identifier of the service; or a logical channel identifier of the service.

For the relevant descriptions of various identifiers of the service here, reference may be made to the corresponding embodiments described hereinbefore, which will not be repeated here.

In related art, if the SDT process is initiated when the UE is in the idle state or inactive state, since the system defaults that the UE in the idle state or inactive state will not perform connection failure detection, resulting in that the UE is unable to evaluate the reliability of the connection, and the UE cannot perform a corresponding processing when the connection is unreliable. Therefore, what kind of connection failure detection needs to be adopted when the UE is in the idle state/inactive state, how to provide the failure detection configuration to the UE, and what measure needs to be taken when the connection failure occurs are all problems that need to be addressed.

Embodiments of the present disclosure enables the UE in the idle state or inactive state to perform a corresponding connection failure detection in the SDT process, and perform a corresponding processing when it is determined according to the result of the connection failure detection that the connection failure occurs, so that the reliability of data transmission is improved.

The UE performs the connection failure detection for the connection in the SDT process according to the network configuration or the protocol, and performs a corresponding failure processing when the failure is detected.

The network side provides the connection failure detection configuration and/or the beam recovery configuration of the SDT process.

The terminal side performs the connection failure detection for the SDT process according to the connection failure detection configuration of the SDT process.

For example, according to the configuration from the network and/or specified in the protocol, the UE performs the connection failure detection on the connection in the SDT process. Here, the configuration from the network and/or specified in the protocol includes at least the connection failure configuration as described above.

One or more items in the failure detection configuration and/or the beam recovery configuration may be provided to the UE in at least one of the following ways:

sending to the UE via system information;

sending to the UE via a connection release message: or being specified in a protocol.

The trigger event that starts the connection failure detection in the SDT process includes any one of:

the SDT process being triggered: or sending uplink data for the first time in the SDT process.

Sending the data for the first time in the SDT process includes any of:

sending the data for the first time via an Msg3 in a four-step RACH SDT;

sending the data for the first time via an MsgA in a two-step RACH SDT: or sending the data for the first time via a CG resource in a CG-SDT.

Receiving an acknowledgment indication from the network side includes any of:

successfully receiving a contention resolution identifier of an Msg4 in a four-step RACH SDT;

successfully receiving a contention resolution identifier of an MsgB in two-step RACH SDT: or successfully receiving a data reception success indication from the network in a CG-SDT.

A stop event for stopping the connection failure detection includes any of:

the connection state of the UE being changed from an inactive state (RRC_INACTIVE) or being changed from the inactive state (RRC_INACTIVE) to an idle state (RRC_IDLE): or the connection state of the UE being changed to a connected state (RRC_CONNECTED).

A specific indication information is received from the network. The specific indication information may include any of:

a connection release message;

a connection recovery message;

a connection rejection message: or a connection establishment message.

The failure detection configuration being specified in the protocol includes at least one of:

value(s) of the counter and/or timer in the failure detection configuration being specified in the protocol: or a signal for the physical layer out-of-sync detection being specified in the protocol.

Depending on different types of the SDT process, the signal for the physical layer out-of-sync detection may be any of the following signals.

For the four-step RACH SDT, the downlink signal includes any of the following signals.

A downlink signal associated with a PRACH transmission resource. For example, four PRACH resources (i.e., PRACH-1, PRACH-2, PRACH-3, and PRACH-4) in a PRACH configuration correspond to four different downlink signals (including: SSB-1, SSB-2, SSB-3, and SSB-4), respectively. When the UE selects the PRACH-1 for sending uplink data, the SSB-1 associated with the PRACH-1 is used for the physical layer out-of-sync detection.

A downlink signal corresponding to a physical control channel for dispatching the contention resolution identifier of the Msg4, for example, a signal that has a quasi-co-location relationship with a PDCCH (physical downlink control channel) which is a channel for dispatching the transmission of the contention resolution identifier of the Msg4 on a PDSCH (physical downlink shared channel), such as SSB-1.

A downlink signal corresponding to a physical control channel for a subsequent data dispatching after the contention resolution identifier of the Msg4 is successfully received. For example, after the random access contention resolution, the UE configures a corresponding PDCCH through a specific search space to receive dispatching information for subsequent data transmission and reception, and a signal that has a quasi-co-location relationship with the PDCCH channel is such as SSB-1. The signal that has a quasi-co-location relationship with the PDCCH channel may be: the downlink signal associated with the PRACH transmission resource.

All specific downlink signals corresponding to a cell or a BWP where the SDT process occurs, such as all SSBs configured on an initial BWP when the SDT process is configured to be executed on the initial BWP.

All detected specific downlink signals corresponding to a cell or a BWP where the SDT process occurs. For example, the SDT process is configured to be executed on an initial BWP, the specific downlink signal configured on the initial BWP is SSB-1/2/3/4, and the UE detects the SSB-1/2, then the SSB-1/2 is used as a detection signal.

For the two-step RACH SDT, the signal includes any of the following signals.

A downlink signal associated with an MsgA transmission resource. For example, four PRACH resources (i.e., PRACH-1, PRACH-2, PRACH-3, and PRACH-4) in an MsgA configuration correspond to four different downlink signals (for example, SSB-1, SSB-2, SSB-3, and SSB-4), respectively. When the UE selects the PRACH-1 for sending uplink data, the SSB-1 associated with the PRACH-1 is used for the physical layer out-of-sync detection.

A downlink signal corresponding to a physical control channel for dispatching the contention resolution identifier of the MsgB, for example, a signal that has a quasi-co-location relationship with a PDCCH channel which is a channel for dispatching the transmission of the contention resolution identifier of the MsgB on a PDSCH, such as SSB-1.

A downlink signal corresponding to a physical control channel for a subsequent data dispatching after the contention resolution identifier of the MsgB is successfully received. For example, after the contention resolution in the SDT process, the UE configures a corresponding PDCCH through a specific search space to receive dispatching information for subsequent data transmission and reception, and a signal that has a quasi-co-location relationship with the PDCCH channel is the downlink signal for performing the connection failure detection in the SSD process, such as SSB-1. The signal that has a quasi-co-location relationship with the PDCCH channel may be: the downlink signal associated with the MsgA transmission resource.

All specific downlink signals corresponding to a cell or a BWP where the SDT process occurs.

All detected specific downlink signals corresponding to a cell or a BWP where the SDT process occurs.

For the CG-SDT, the signal includes any of the following signals.

A downlink signal associated with a CG PUSCH transmission resource. For example, four CG resources (i.e., CG-1, CG-2, CG-3, and CG-4) included in a resource cycle in a CG configuration correspond to four different downlink signals (for example, SSB-1, SSB-2, SSB-3, and SSB-4), respectively. When the UE selects the CG-1 for sending uplink data, the SSB-1 associated with the CG-1 is used for the physical layer out-of-sync detection.

A downlink signal corresponding to a physical control channel for sending the data reception success indication, for example, a downlink signal that has a quasi-co-location relationship with a PDCCH channel which is a channel for sending the data reception success indication, such as SSB-1.

A downlink signal corresponding to a physical control channel for a subsequent data dispatching after the data reception success indication is successfully received. For example, after the data reception success indication is successfully received in the SDT process, the UE configures a corresponding PDCCH through a specific search space to receive dispatching information for subsequent data transmission and reception, and a signal that has a quasi-co-location relationship with the PDCCH channel is such as SSB-1. The signal that has a quasi-co-location relationship with the PDCCH channel may be: the downlink signal associated with the CG PUSCH transmission resource.

All specific downlink signals corresponding to a cell or a BWP where the SDT process occurs.

All detected specific downlink signals corresponding to a cell or a BWP where the SDT process occurs.

A signal specified in the protocol for the beam failure detection.

With reference the above way in which the signal for the physical layer out-of-sync detection is specified in the protocol, the signal for the beam failure detection may be specified in the protocol in a similar way.

Step 2: according to step 1, when the connection failure is detected, the UE determines the type of the connection failure, and reacquires the connection according to the type of the connection failure. In the following, there are provided several alternatives to re-acquire the connection after the connection failure is detected:

Alternative 1: the UE changes from an inactive state (RRC_INATIVE) to an idle state (RRC_IDLE). Furthermore, an AS (access stratum) layer of the UE may indicate the failure information to an NAS (non-access stratum) layer. Furthermore, the NAS layer of the UE may trigger the process of the connection establishment.

Alternative 2: the UE triggers the process of the connection establishment, in which a connection establishment request message is sent to re-perform the connection establishment.

Alternative 3: the UE triggers the process of the connection recovery, in which a connection recovery request message is sent to request the connection recovery.

Alternative 4: the UE triggers the process of the connection reestablishment process, in which the UE sends a connection reestablishment request message to implement connection reestablishment after a suitable cell is selected via a cell selection process.

After the UE detects the connection failure, the processing method of the UE for the beam failure may include:

Alternative 5: triggering the process of the beam recovery.

The process of the beam recovery includes any of the following manners.

A specific downlink beam meeting a measurement threshold value is selected, and a corresponding uplink transmission resource is selected according to the specific downlink beam to send an uplink signal. For example, after the beam failure occurs, the UE triggers a random access process, selects a specific downlink beam SSB-1 that meets the threshold value, and selects a PRACH-1 resource associated with the SSB-1 to send a random access request. During the random access process, the UE sends its identification information to the network side. For example, a C-RNTI MAC CE is sent to the network side in an Msg3 or an MsgA. After the random access process is successfully completed, the beam identified by the SSB-1 is used as its service beam.

The specific downlink beam meeting the measurement threshold value is reported to the network side.

One or more items in the beam recovery configuration information may be provided to the UE in at least one of the following ways:

sending the beam recovery configuration to the UE via system information;

sending the beam recovery configuration to the UE via a connection release message; or specifying the beam recovery configuration to the UE in a protocol.

Specifying the beam recovery configuration in the protocol includes at least one of:

specifying value(s) of a counter and/or a timer in the beam recovery configuration in the protocol.

A random access priority configuration in the beam recovery configuration is specified in the protocol. For example, the access priority configuration involves a power ramp value, and/or a backoff time scaling factor value for retransmission of the random access request.

According to the protocol, all contention-based random access request resources of a cell or a BWP where the SDT process occurs are reused random access request resources for the beam recovery.

According to the protocol, a measurement threshold value for selecting the downlink signal corresponding to the random access request resource of the contention-based random access process of the cell or the BWP where the SDT process occurs is reused as a measurement threshold value for selecting candidate beams in the process of the beam recovery.

According to the protocol, a resource used for network feedback information on the beam recovery is:

a resource for a subsequent data sending phase of the SDT process, such as a PDCCH of search space-1 for dispatching data in the subsequent data sending phase;

a resource for receiving the network feedback information in the contention-based random access process of the BWP or cell where the SDT process occurs, for example, a search space-0 or a control set (CORESET-0) may be used to receive Msg2, Msg4 or MsgB in the contention-based random access process.

If the process of the beam recovery also fails, the UE adopts any one of the above alternatives 1 to 4. Specifically, for example, the connection between the UE and the base station may be reacquired through the process of the connection establishment or the connection re-establishment. The beam recovery failure here may for example include a case where the random access process corresponding to the beam recovery reaches the maximum number of transmissions.

In some embodiments, the UE may report failure information of the detection result of the connection failure detection to the network side. For example, the UE only reports the failure information, but not success information, so as to reduce unnecessary reporting. If the network side does not receive any information on the connection detection result, it is considered that the connection failure detection of the UE does not find a failed connection in the SDT process. If the failure information is received, it is considered that a failed connection is found by the connection failure detection of the UE in the SDT process. Of course, in other cases, the result of the connection failure detection may also include: success information of the detection result which indicates that the connection has not failed (that is, the connection succeeds).

The failure information includes at least one of:

a connection failure type indication, for indicating physical layer out-of-synchronization, MAC layer random access failure, the RLC layer reaching the maximum number of retransmissions or beam failure that causes the connection failure;

an SDT process indication, configured to at least indicate whether the connection failure happens in the SDT process;

an SDT process type indication, where the SDT process type may include an SDT process occurring in a four-step random access, an SDT process occurring in two-step random access, or an SDT process performed based on a CG-PUSCH resource: or a service indication, for indicating a service where the connection failure occurs.

The service indication information includes at least one of:

a radio bearer identifier, RB identifier, which may be a date radio bearer, DRB;

a service flow identifier, such as QoS flow-1;

a session identifier, such as PDU Session-1: or a logical channel identifier, such as LCH-1.

Figure 9:
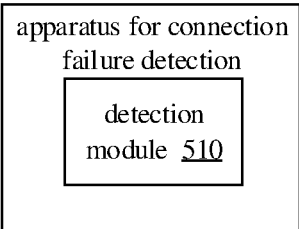
FIG. 9 is a schematic structural diagram showing an apparatus for a connection failure detection according to an illustrative embodiment.

As shown in FIG. 9, embodiments of the present disclosure provide an apparatus for a connection failure detection. The apparatus includes a detection module 510.

The detection module 510 is configured to perform the connection failure detection for a small data transmission SDT process.

In an embodiment, the detection module 510 may be a program module that, when executed by a processor, causes the connection failure detection for the SDT process to be performed.

In another embodiment, the detection module 510 may be a hardware-software combination module: the hardware-software combination module includes, but is not limited to: a programmable circuit: and the programmable circuit includes, but is not limited to: a field programmable circuit and/or a complex programmable circuit.

In still some embodiments, the detection module 510 may also include a pure hardware module: and the pure hardware module includes but is not limited to an application specific integrated circuit.

In an embodiment, the detection module 510 is configured to perform the connection failure detection for the SDT process according to a failure detection configuration obtained.

In an embodiment, the failure detection configuration includes:

the failure detection configuration received from a network side; and/or the failure detection configuration specified in a protocol.

In an embodiment, the failure detection configuration received from the network side includes:

the failure detection configuration received from the network side and carried in a system message: and/or the failure detection configuration received from the network side and carried in a connection release message.

In an embodiment, the acquisition module is configured to perform the connection failure detection for the SDT process in response to detecting a trigger event.

In an embodiment, the trigger event includes at least one of:

starting the SDT process;

the UE sending uplink data for the first time in the SDT process: or the UE receiving an acknowledgment indication from a network side.

The acknowledgment indication is an indication sent by the network side after receiving the uplink data sent for the first time in the SDT process.

In an embodiment, sending the uplink data for the first time in the SDT process includes at least one of:

the UE sending the uplink data for the first time via a random access message 3 of a four-step random access;

the UE sending the uplink data for the first time via a random access message A of a two-step random access: or the UE sending the uplink data for the first time on a configure grant CG physical uplink shared channel PUSCH resource.

In an embodiment, the acquisition module is configured to perform at least one of:

receive a contention resolution identifier of a four-step random access message 4 from the network side;

receive a contention resolution identifier of a two-step random access message B from the network side: or receive a successful indication of data transmission on a CG PUSCH resource from the network side.

In an embodiment, the apparatus further includes: a stop module, configured to stop the connection failure detection for the SDT process in response to a stop event being detected.

In an embodiment, the stop event being detected includes:

a connection state of the UE being changed: and/or the UE receiving connection-associated specific indication information from the network side.

In an embodiment, the connection state of the UE being changed includes at least one of:

the connection state of the UE being changed from an inactive state to an idle state;

the connection state of the UE being changed from an inactive state to a connected state: or the connection state of the UE being changed from an idle state to a connected state.

In an embodiment, the acquisition module is configured to perform at least one of:

the UE receiving a connection release message from the network side;

the UE receiving a connection recovery message from the network side;

the UE receiving a connection rejection message from the network side: or the UE receiving a connection establishment message from the network side.

In an embodiment, the failure detection configuration includes at least one of:

timer information, indicating a timer associated with the connection failure detection;

counter information, indicating a counter associated with the connection failure detection: or signal indication information, for indicating a signal for performing the connection failure detection.

In an embodiment, the timer includes at least one of:

a physical layer out-of-sync timer, configured to time a physical layer out-of-synchronization; or a beam failure detection timer, configured to time a beam failure detection.

In an embodiment, the counter includes at least one of:

an out-of-sync counter, configured to count physical layer out-of-sync indications;

a synchronization counter, configured to count physical layer synchronization indications;

a beam failure counter, configured to count beam failures;

a media access control MAC layer random access counter, configured to count random access times of an MAC layer: or a radio link control RLC layer transmission counter, configured to count transmission times of an RLC layer.

In an embodiment, the signal indication information is configured to indicate at least one of:

a signal of a physical layer out-of-sync detection in the connection failure detection; or a signal of a beam failure detection in the connection failure detection.

In an embodiment, the signal indicated by the signal indication information includes at least one of:

a downlink signal associated with a physical downlink random access channel PRACH resource of a four-step random access;

a downlink signal associated with a physical downlink control channel PDCCH for dispatching a contention resolution identifier of a four-step random access;

a downlink signal associated with a PDCCH channel for dispatching a data transmission, after successfully receiving a contention resolution identifier of a random access message 4 of a four-step random access;

a downlink signal associated with a random access message A of a two-step random access;

a downlink signal associated with a PDCCH for dispatching data, after receiving a contention resolution identifier of a random access message B of a two-step random access;

a downlink signal associated with a CG PUSCH resource;

a downlink signal associated with a PDCCH that sends a transmission success indication: the transmission success indication being configured to indicate a successful data transmission on a CG PUSCH;

a downlink signal associated with a PDCCH for dispatching a data transmission, after receiving the transmission success indication;

a downlink signal sent by a cell where the UE is located;

a downlink signal sent by a BWP where the UE is located;

a downlink signal of a cell detectable by the UE: or a downlink signal detectable by a BWP where the UE is located.

In an embodiment, the apparatus further includes:

a connection module, configured to reacquire a connection in response to determining a connection failure based on a result of the failure detection; or a state handover module, configured to enter an idle state in response to determining the connection failure based on the result of the failure detection.

In an embodiment, the apparatus further includes: a recovery module, configured to perform beam recovery, in response to determining based on a result of the failure detection that a cause of the connection failure is a beam failure.

In an embodiment, the recovery module is configured to perform the beam recovery according to a beam recovery configuration.

In an embodiment, the apparatus further includes a beam recovery configuration module configured to perform at least one of:

receiving the beam recovery configuration carried in a system message;

receiving the beam recovery configuration carried in a connection release message; or determining the beam recovery configuration based on a protocol.

In an embodiment, the beam recovery configuration includes at least one of:

beam recovery counter information, indicating a counter for counting a number of times of beam recovery;

beam recovery timer information, indicating a timer for timing a beam recovery duration;

a priority configuration, for indicating a priority of a random access corresponding to the beam recovery, in which random access configurations for beam recovery corresponding to different priorities are different;

a resource configuration, indicating a resource used for the beam recovery: or a threshold configuration, indicating a threshold value used for the beam recovery.

In an embodiment, the resource configuration indicates that a contention-based random access request resource of a cell or a BWP where the SDT process occurs is used for the beam recovery.

In an embodiment, the threshold configuration indicates that a threshold value for selecting a random access request resource is reused as the threshold value for the beam recovery.

In an embodiment, the apparatus further includes a feedback module configured to receive feedback information on the beam recovery from the network side. The feedback information indicates a result of the beam recovery.

In an embodiment, the feedback module is configured to:

receive the feedback information on a resource in a subsequent data sending phase of the SDT process: and/or receive the feedback information carried in a message sent by the network side in a random access.

In an embodiment, the feedback module is configured to receive the feedback information on a PDCCH resource for dispatching a data transmission in the subsequent data sending phase of the SDT process.

In an embodiment, the feedback module is configured to perform at least one of: receiving the feedback information carried in a random access message 2 sent by the network side in a four-step random access:

receiving the feedback information carried in a random access message 4 sent by the network side in a four-step random access: or receiving the feedback information carried in a random access message B sent by the network side in a four-step random access.

In an embodiment, the apparatus further includes:

a connection module, configured to reacquire a connection in response to a failed beam recovery: or a state handover module, configured to enter an idle state in response to a failed beam recovery.

In an embodiment, the connection module is configured to perform at least one of:

triggering a connection establishment based on a non-access stratum NAS message;

triggering a connection establishment based on a connection establishment request message;

triggering a connection recovery based on a connection recovery request message: or triggering a connection re-establishment based on a connection re-establishment request message.

In an embodiment, the apparatus further includes a reporting module configured to report a result of the connection failure detection.

In an embodiment, the result of the connection failure detection includes at least one of:

a connection failure type indication, indicating a type of a connection failure;

an SDT process indication, configured to indicate that the connection failure is detected in the SDT process;

an SDT phase indication, configured to indicate an SDT phase when the connection failure occurs, the SDT phase including: an initial data sending phase and/or a subsequent data sending phase in the SDT process;

an SDT process type indication, configured to indicate a type of the SDT process;

a service indication, configured to indicate a service that triggers the SDT process.

In an embodiment, the service indication includes at least one of:

a radio bearer RB identifier of the service;

a service flow identifier of the service;

a session identifier of the service: or a logical channel identifier of the service.

Figure 10:
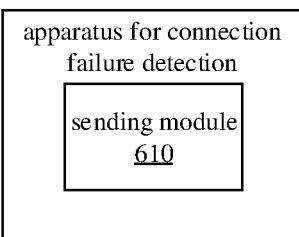
FIG. 10 is a schematic structural diagram showing an apparatus for a connection failure detection according to an illustrative embodiment.

As shown in FIG. 10, embodiments of the present disclosure provide a information processing apparatus. The apparatus includes a sending module 610.

The sending module 610 is configured to send a failure detection configuration. The failure detection configuration is configured for a UE to perform a connection failure detection for an SDT process.

In an embodiment, the sending module 610 may be a program module that, when executed by a processor, sends the failure detection configuration to UE to perform the connection failure detection for the SDT process.

In another embodiment, the detection module may be a hardware-software combination module: the hardware-software combination module includes, but is not limited to: a programmable circuit: and the programmable circuit includes, but is not limited to: a field programmable circuit and/or a complex programmable circuit.

In still some embodiments, the detection module may also include a pure hardware module: and the pure hardware module includes but is not limited to an application specific integrated circuit.

In an embodiment, the sending module 610 is configured to:

send a system message carrying the failure detection configuration: and/or send a connection release message carrying the failure detection configuration.

In an embodiment, the receiving module is configured to receive connection-associated specific indication information. The specific indication information is configured to trigger the UE to stop the connection failure detection for the SDT process.

In an embodiment, the specific indication information includes at least one of:

a connection release message;

a connection recovery message;

a connection rejection message: or a connection establishment message.

In an embodiment, the failure detection configuration includes at least one of:

timer information, indicating a timer associated with the connection failure detection;

counter information, indicating a counter associated with the connection failure detection: or signal indication information, for indicating a signal for performing the connection failure detection.

In an embodiment, the timer includes at least one of:

a physical layer out-of-sync timer, configured to time a physical layer out-of-synchronization; or a beam failure detection timer, configured to time a beam failure detection.

In an embodiment, the counter includes at least one of:

an out-of-sync counter, configured to count physical layer out-of-sync indications;

a synchronization counter, configured to count physical layer synchronization indications;

a beam failure counter, configured to count beam failures;

a media access control MAC layer random access counter, configured to count random access times of an MAC layer: or a radio link control RLC layer transmission counter, configured to count transmission times of an RLC layer.

In an embodiment, the signal indication information is configured to indicate at least one of:

a signal of a physical layer out-of-sync detection in the connection failure detection; or a signal of a beam failure detection in the connection failure detection.

In an embodiment, the signal indicated by the signal indication information includes at least one of:

a downlink signal associated with a physical downlink random access channel PRACH resource of a four-step random access;

a downlink signal associated with a physical downlink control channel PDCCH for dispatching a contention resolution identifier of a four-step random access;

a downlink signal associated with a PDCCH channel for dispatching a data transmission, after successfully receiving a contention resolution identifier of a random access message 4 of a four-step random access;

a downlink signal associated with a random access message A of a two-step random access;

a downlink signal associated with a PDCCH for dispatching data, after receiving a contention resolution identifier of a random access message B of a two-step random access;

a downlink signal associated with a CG PUSCH resource;

a downlink signal associated with a PDCCH that sends a transmission success indication: the transmission success indication being configured to indicate a successful data transmission on a CG PUSCH;

a downlink signal associated with a PDCCH for dispatching a data transmission, after receiving the transmission success indication;

a downlink signal sent by a cell where the UE is located;

a downlink signal sent by a BWP where the UE is located;

a downlink signal of a cell detectable by the UE: or a downlink signal detectable by a BWP where the UE is located.

In an embodiment, the sending module 610 is further configured to send a beam recovery configuration. The beam recovery configuration is configured for the UE to perform beam recovery when it is detected in the SDT process that a cause of a connection failure is a beam failure.

In an embodiment, the sending module 610 is configured to perform at least one of:

sending a system message carrying the beam recovery configuration: or sending a connection release message carrying the beam recovery configuration.

In an embodiment, the beam recovery configuration includes at least one of:

beam recovery counter information, indicating a counter for counting a number of times of beam recovery;

beam recovery timer information, indicating a timer for timing a beam recovery duration;

a priority configuration, for indicating a priority of a random access corresponding to the beam recovery, in which random access configurations for beam recovery corresponding to different priorities are different;

a resource configuration, indicating a resource used for the beam recovery: or a threshold configuration, indicating a threshold value used for the beam recovery.

In an embodiment, the resource configuration indicates that a contention-based random access request resource of a cell or a BWP where the SDT process occurs is used for the beam recovery.

In an embodiment, the threshold configuration indicates that a threshold value for selecting a random access request resource is reused as the threshold value for the beam recovery.

In an embodiment, the sending module 610 is configured to send feedback information on the beam recovery according to a result of the beam recovery from the UE.

In an embodiment, the sending module 610 is configured to:

send the feedback information on a resource in a subsequent data sending phase of the SDT process: and/or send a message carrying the feedback information in a random access.

In an embodiment, the sending module 610 is further configured to: send the feedback information on a PDCCH resource for dispatching a data transmission in the subsequent data sending phase of the SDT process.

In an embodiment, the sending module 610 is configured to at least one of:

send a random access message 2 carrying the feedback information in a four-step random access at a network side;

send a random access message 4 carrying the feedback information in a four-step random access: or send a random access message B carrying the feedback information in a four-step random access.

In an embodiment, the apparatus further includes a receiving module configured to receive a result of the connection failure detection.

In an embodiment, the result of the connection failure detection includes at least one of:

a connection failure type indication, indicating a type of a connection failure;

an SDT process indication, configured to indicate that the connection failure is detected in the SDT process;

an SDT phase indication, configured to indicate an SDT phase when the connection failure occurs, the SDT phase including: an initial data sending phase and/or a subsequent data sending phase in the SDT process;

an SDT process type indication, configured to indicate a type of the SDT process: or a service indication, configured to indicate a service that triggers the SDT process.

In an embodiment, the service indication includes at least one of:

a radio bearer RB identifier of the service;

a service flow identifier of the service;

a session identifier of the service: or a logical channel identifier of the service.

Embodiments of the present disclosure provide a communication device, which includes: a processor, and a memory for storing an instruction executable by the processor. The processor is connected to the memory and configured to perform the method for the connection failure detection as provided in any technical solution as described hereinbefore.

The processor may include various types of storage media, which are non-transitory computer storage media that can continue to memorize and store information thereon after the communication device is powered off.

Here, the communication device includes: a UE or a base station.

The processor may be connected to the memory via a bus or the like, to read the executable program stored on the memory, for example, at least one of the methods shown in FIG. 2 and FIG. 4 to FIG. 8.

Figure 11:
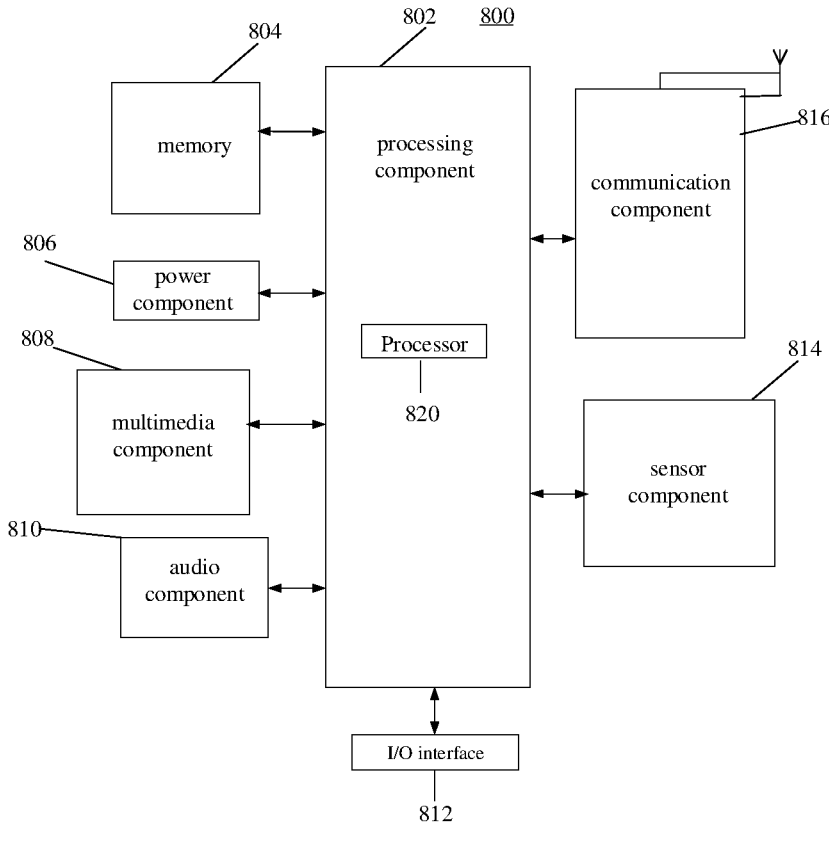
FIG. 11 is a schematic structural diagram showing a UE according to an illustrative embodiment.

FIG. 11 is a block diagram showing a UE 800 according to an illustrative embodiment. For example, the UE 800 may be a mobile phone, a computer, a digital broadcast terminal, a messaging device, a gaming console, a tablet, a medical device, exercise equipment, a personal digital assistant, and the like.

Referring to FIG. 11, the UE 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the UE 800, such as the operations associated with display, telephone calls, data communications, camera operations, and recording operations. The processing component 802 may include one or more processors 820 to execute instructions to perform all or some of the steps in the above-described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the UE 800. Examples of such data include instructions for any applications or methods operated on the UE 800, contact data, phonebook data, messages, pictures, videos, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the UE 800. The power component 806 may include a power management system, one or more power sources, and any other components associated with the generation, management, and distribution of power in the UE 800.

The multimedia component 808 includes a screen providing an output interface between the UE 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and/or the rear camera may receive an external multimedia datum while the UE 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone (MIC) configured to receive an external audio signal when the UE 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as keyboards, click wheels, buttons, and the like. The buttons may include, but are not limited to, a home button, a volume button, a starting button, and a locking button.

The sensor component 814 includes one or more sensors to provide status assessments of various aspects of the UE 800. For instance, the sensor component 814 may detect an open/closed status of the UE 800, relative positioning of components, e.g., the display and the keypad, of the UE 800, a change in position of the UE 800 or a component of the UE 800, a presence or absence of user contact with the UE 800, an orientation or an acceleration/deceleration of the UE 800, and a change in temperature of the UE 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wireless, between the UE 800 and other devices. The UE 800 can access a wireless network based on a communication standard, such as WiFi, 2G, 3G, 4G LTE, 5G NR, or a combination thereof. In one illustrative embodiment, the communication component 816 receives a broadcast signal or broadcast associated information from an external broadcast management system via a broadcast channel. In one illustrative embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In illustrative embodiments, the UE 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above-described methods.

In illustrative embodiments, there is also provided a non-transitory computer-readable storage medium including instructions, such as included in the memory 804, executable by the processor 820 in the UE 800, for performing any method for the connection failure detection as described above, such as at least one of the methods shown in FIG. 6 to FIG. 8. For example, the non-transitory computer-readable storage medium may be a ROM, a random access memory (RAM), a CD-ROM, a magnetic tape, a floppy disc, an optical data storage device, and the like.

Figure 12:
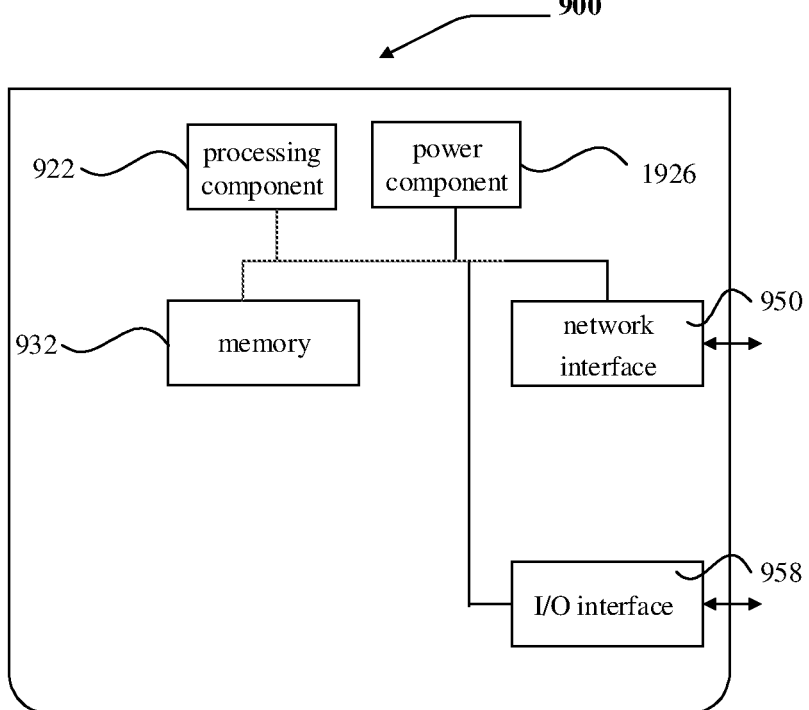
FIG. 12 is a schematic structural diagram showing a base station according to an illustrative embodiment.

As shown in FIG. 12, an embodiment of the present disclosure shows a structure of a base station. Referring to FIG. 12, the base station 900 includes a processing component 922, which further includes one or more processors, and a memory resource represented by a memory 932 for storing instructions executable by the processing component 922, such as application programs. The application program stored in memory 932 may include one or more modules each corresponding to a set of instructions. In addition, the processing component 922 is configured to execute instructions, so as to perform any of the aforementioned methods applied to the base station, for example at least one of the methods shown in FIG. 6 to FIG. 8.

The base station 900 may also include a power component 926 configured to perform power management of the base station 900, a wired or wireless network interface 950 configured to connect the base station 900 to a network, and an input-output (I/O) interface 958. The base station 900 can operate based on an operating system stored in the memory 932, such as Windows Server™, Mac OS X™, Unix™, Linux™, FreeBSD™ or the like.

Other embodiments of the present disclosure will be apparent to those skilled in the art from consideration of the specification and practice of the present disclosure disclosed here. This present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of embodiments of the present disclosure being indicated by the following claims.

It will be appreciated that embodiments of the present disclosure are not limited to the exact construction that has been described above and illustrated in the accompanying drawings, and that various modifications and changes can be made without departing from the scope thereof. It is intended that the scope of embodiments of the present disclosure only be limited by the appended claims.

What is claimed is:

1. A method for a connection failure detection, performed by a user equipment (UE), the method comprising:

performing the connection failure detection for a small data transmission (SDT) process according to a failure detection configuration obtained, wherein the failure detection configuration comprises at least one of:

counter information, indicating a counter associated with the connection failure detection; or signal indication information, for indicating a signal for performing the connection failure detection;

wherein the method further comprises: stopping the connection failure detection for the SDT process, in response to a stop event being detected;

wherein the stop event being detected comprises at least one of:

a connection state of the UE being changed; or the UE receiving connection-associated specific indication information from a network side;

wherein the UE receiving the connection-associated specific indication information from the network side comprises at least one of:

the UE receiving a connection release message from the network side;

the UE receiving a connection recovery message from the network side;

the UE receiving a connection rejection message from the network side; or the UE receiving a connection establishment message from the network side.

2. The method according to claim 1, wherein the failure detection configuration comprises at least one of:

the failure detection configuration received from the network side; or the failure detection configuration specified in a protocol.

3. The method according to claim 2, wherein the failure detection configuration received from the network side comprises at least one of:

the failure detection configuration received from the network side and carried in a system message; or the failure detection configuration received from the network side and carried in the connection release message.

4. The method according to claim 1, wherein performing the connection failure detection for the SDT process comprises:

performing the connection failure detection for the SDT process, in response to detecting a trigger event.

5. The method according to claim 4, wherein the trigger event comprises at least one of:

starting the SDT process;

the UE sending uplink data for the first time in the SDT process; or the UE receiving an acknowledgment indication from the network side, wherein the acknowledgment indication is an indication sent by the network side after receiving the uplink data sent for the first time in the SDT process.

6. The method according to claim 1, wherein the connection state of the UE being changed comprises at least one of:

the connection state of the UE being changed from an inactive state to an idle state;

the connection state of the UE being changed from an inactive state to a connected state; or the connection state of the UE being changed from an idle state to a connected state.

7. An information processing method, performed by a base station, the method comprising:

sending a failure detection configuration, wherein the failure detection configuration is configured for a user equipment (UE) to perform a connection failure detection for a small data transmission (SDT) process;

wherein the failure detection configuration comprises at least one of:

counter information, indicating a counter associated with the connection failure detection; or signal indication information, for indicating a signal for performing the connection failure detection;

wherein the method further comprises: sending connection-associated specific indication information; wherein the specific indication information is configured to trigger the UE to stop the connection failure detection for the SDT process, wherein the specific indication information comprises at least one of:

a connection release message;

a connection recovery message;

a connection rejection message; or a connection establishment message.

8. The method according to claim 7, wherein sending the failure detection configuration comprises at least one of:

sending a system message carrying the failure detection configuration; or sending the connection release message carrying the failure detection configuration.

9. A user equipment (UE), comprising:

a processor;

a transceiver; and a memory storing a program executable by the processor, wherein the processor is configured to perform a connection failure detection for a small data transmission (SDT) process according to a failure detection configuration obtained;

wherein the failure detection configuration comprises at least one of:

counter information, indicating a counter associated with the connection failure detection; or signal indication information, for indicating a signal for performing the connection failure detection;

wherein the processor is further configured to stop the connection failure detection for the SDT process, in response to a stop event being detected;

wherein the stop event being detected comprises at least one of:

a connection state of the UE being changed; or the UE receiving connection-associated specific indication information from a network side;

wherein the UE receiving the connection-associated specific indication information from the network side comprises at least one of:

the UE receiving a connection release message from the network side;

the UE receiving a connection recovery message from the network side;

the UE receiving a connection rejection message from the network side; or the UE receiving a connection establishment message from the network side.

10. A non-transitory computer-readable storage medium having stored therein an executable program that, after executed by a processor, causes the method according to claim 1 to be implemented.

11. A communication device, comprising:

a processor;

a transceiver; and a memory storing a program executable by the processor, wherein the processor is configured to perform the method according to claim 7.

12. A non-transitory computer-readable storage medium having stored therein an executable program that, after executed by a processor, causes the method according to claim 7 to be implemented.

* * * * *